US010638100B2

(12) United States Patent
Sato

(10) Patent No.: US 10,638,100 B2
(45) Date of Patent: Apr. 28, 2020

(54) PROJECTOR, MULTI-PROJECTION SYSTEM, AND METHOD FOR CONTROLLING PROJECTOR

(71) Applicant: SEIKO EPSON CORPORATION, Tokyo (JP)

(72) Inventor: Nozomi Sato, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/232,870

(22) Filed: Dec. 26, 2018

(65) Prior Publication Data

US 2019/0199984 A1 Jun. 27, 2019

(30) Foreign Application Priority Data

Dec. 27, 2017 (JP) ................. 2017-250339

(51) Int. Cl.
*H04N 9/31* (2006.01)
*G03B 37/04* (2006.01)
*G03B 21/13* (2006.01)

(52) U.S. Cl.
CPC .......... *H04N 9/3147* (2013.01); *G03B 21/13* (2013.01); *G03B 37/04* (2013.01); *H04N 9/3185* (2013.01); *H04N 9/3188* (2013.01); *G03B 2206/00* (2013.01)

(58) Field of Classification Search
CPC .... G03B 21/006; G03B 21/008; G03B 21/28; G03B 21/094; G03B 21/147; G03B 21/2066; H04N 9/315; H04N 9/3102; H04N 9/3147; H04N 9/3185; H04N 9/3188; H04N 9/3194; H04N 9/3197
See application file for complete search history.

(56) References Cited

U.S. PATENT DOCUMENTS

| 8,711,213 B2 | 4/2014 | Furui |
| 8,866,902 B2 | 10/2014 | Furui |
| 9,082,330 B2* | 7/2015 | Kotani ................. H04N 9/3147 |
| 9,560,327 B2 | 1/2017 | Ehara |

(Continued)

FOREIGN PATENT DOCUMENTS

JP 2009-524841 A 7/2009

OTHER PUBLICATIONS

May 13, 2019 Extended European Search Report issued in European Patent Application No. 18215342.9.

*Primary Examiner* — Sultan Chowdhury
(74) *Attorney, Agent, or Firm* — Oliff PLC

(57) ABSTRACT

A projector that is allowed to belong to a multi-projection system that projects an image on a projection surface, the image formed of a plurality of partial images including a first partial image, a second partial image, and a third partial image, includes a projection section that projects the third partial image on the projection surface and an adjustment instruction section that transmits, to a first projector that projects the first partial image, a first adjustment instruction of adjusting the projection area of the first partial image based on the projection area of the third partial image and transmits, to a second projector that projects the second partial image after transmitting the first adjustment instruction, a second adjustment instruction of adjusting the projection area of the second partial image based on the projection area of the first partial image.

13 Claims, 7 Drawing Sheets

(56) References Cited

U.S. PATENT DOCUMENTS

| | | |
|---|---|---|
| 2007/0171380 A1 | 7/2007 | Wright et al. |
| 2007/0211225 A1* | 9/2007 | Kondo ................. H04N 9/3147 353/94 |
| 2011/0128294 A1* | 6/2011 | Manabe .................. H04N 9/31 345/581 |
| 2011/0242494 A1* | 10/2011 | Imai ....................... G03B 21/14 353/30 |
| 2013/0222386 A1 | 8/2013 | Tannhauser et al. |
| 2014/0226028 A1 | 8/2014 | Wright et al. |
| 2017/0208304 A1 | 7/2017 | Furui |
| 2017/0208309 A1 | 7/2017 | Oike et al. |

* cited by examiner

PROJECTOR, MULTI-PROJECTION SYSTEM, AND METHOD FOR CONTROLLING PROJECTOR

The entire disclosure of Japanese Patent Application No. 2017-250339, filed Dec. 27, 2017 is expressly incorporated by reference herein.

BACKGROUND

1. Technical Field

The present invention relates to a projector, a multi-projection system, and a method for controlling the projector.

2. Related Art

JP-T-2009-524841 describes a multi-projection system in which a plurality of projectors project partial images and an overall image formed of the partial images is displayed on a projection surface.

In the multi-projection system, projection areas of the plurality of partial images need to be so precisely adjusted that the plurality of partial images form the overall image, and the adjustment is made by a user of the multi-projection system. The adjustment of the projection areas therefore requires the user's effort.

SUMMARY

An advantage of some aspects of the invention is to provide a technology capable of lightening effort spent on adjustment of projection areas.

An aspect of a projector according to the invention is directed to a projector that is allowed to belong to a multi-projection system that projects an image on a projection surface, the image formed of a plurality of partial images including a first partial image, a second partial image, and a third partial image, the projector including a projection section that projects the third partial image on the projection surface and an adjustment instruction section that transmits, to a first projector that projects the first partial image, a first adjustment instruction of adjusting a projection area of the first partial image based on a projection area of the third partial image and transmits, to a second projector that projects the second partial image after transmitting the first adjustment instruction, a second adjustment instruction of adjusting a projection area of the second partial image based on the projection area of the first partial image.

The aspect described above allows adjustment of the projection areas of the first and second partial images based directly or indirectly on the projection area of the third partial image. Therefore, for example, a user's adjustment of the projection area of the third partial image allows adjustment of the projection areas of the first and second partial images based on the adjusted projection area of the third partial image. The effort of the adjustment of the projection areas can therefore be reduced as compared with a case where the user adjusts all the projection areas of the first to third partial images.

In the aspect of the projector described above, it is desirable that the adjustment instruction section transmits the second adjustment instruction to the second projector when the adjustment instruction section receives from the first projector completion notice indicating that the adjustment of the projection area of the first partial image has been completed in accordance with the first adjustment instruction.

According to the aspect described above, the adjustment of the projection area of the second partial image is performed after the adjustment of the projection area of the first partial image is completed. The projection areas of the first and second partial images adjusted based directly or indirectly on the projection area of the third partial image. Therefore, for example, the user's adjustment of the projection area of the third partial image allows adjustment of the projection areas of the first and second partial images based on the adjusted projection area of the third partial image. The effort of the adjustment of the projection areas can therefore be reduced as compared with the case where the user adjusts all the projection areas of the first to third partial images.

In the aspect of the projector described above, it is desirable that the first adjustment instruction contains a first position adjustment instruction of adjusting a position of the projection area of the first partial image based on a position of the projection area of the third partial image.

According to the aspect described above, the position of the projection area of the first partial image can be adjusted based on the position of the projection area of the third partial image.

In the aspect of the projector described above, it is desirable that the first adjustment instruction further contains first specific information for identifying the third partial image and first relative position information representing a relative positional relationship between the projection area of the third partial image and a target projection area of the first partial image.

According to the aspect described above, the first projector can identify the third partial image by using the first specific information. The first projector can adjust the projection area of the first partial image to the target projection area of the first partial image by using the projection area of the third partial image identified by using the first specific information and the first relative positional information.

In the aspect of the projector described above, it is desirable that the first specific information represents a color of the third partial image.

According to the aspect described above, the first projector can identify the third partial image based on the color of the third partial image.

In the aspect of the projector described above, it is desirable that the first adjustment instruction further contains first specifying information that specifies a color different from the color of the third partial image as the color of the first partial image.

According to the aspect described above, the first projector can distinguish the first and third partial images from each other in terms of color. The first projector can therefore recognize the relative relationship between the first and third partial images.

In the aspect of the projector described above, it is desirable that the first adjustment instruction contains a first size adjustment instruction of adjusting a size of the projection area of the first partial image based on a size of the projection area of the third partial image.

According to the aspect described above, the size of the projection area of the first partial image can be adjusted based on the size of the projection area of the third partial image.

In the aspect of the projector described above, it is desirable that the second adjustment instruction contains a second position adjustment instruction of adjusting a position of the projection area of the second partial image based on a position of the projection area of the first partial image.

According to the aspect described above, the position of the projection area of the second partial image can be adjusted based on the position of the projection area of the first partial image.

In the aspect of the projector described above, it is desirable that the second adjustment instruction contains a second size adjustment instruction of adjusting a size of the projection area of the second partial image based on a size of the projection area of the first partial image.

According to the aspect described above, the size of the projection area of the second partial image can be adjusted based on the size of the projection area of the first partial image.

In the aspect of the projector described above, it is desirable that a target projection area of the first partial image is in contact with or partly overlaps with the projection area of the third partial image.

According to the aspect described above, the projection area of the third partial image in contact with the target projection area of the first partial image or the projection area of the third partial image that partly overlaps with the target projection area of the first partial image can be used to adjust the first partial image. Therefore, for example, in a case where the first projector captures an image of both the third and first partial images with a camera to produce captured image information and the captured image information is used to adjust the first partial image, the captured area can be reduced as compared with a case where the third and first partial images are separate from each other.

In the aspect of the projector described above, it is desirable that a target projection area of the second partial image is in contact with or partly overlaps with the projection area of the first partial image.

According to the aspect described above, the projection area of the first partial image in contact with the target projection area of the second partial image or the projection area of the first partial image that partly overlaps with the target projection area of the second partial image can be used to adjust the second partial image. Therefore, for example, in a case where the second projector captures an image of both the first and second partial images with a camera to produce captured image information and the captured image information is used to adjust the second partial image, the captured area can be reduced as compared with a case where the first and second partial images are separate from each other.

In the aspect of the projector described above, it is desirable that the plurality of partial images include the third partial image, a plurality of fourth partial images, and a plurality of fifth partial images, that the first partial image is any of the plurality of fourth partial images, that the second partial image is any of the plurality of fifth partial images, and that the adjustment instruction section transmits, for each of the fourth partial images to a third projector that is a projector that projects the fourth partial image, a third adjustment instruction of adjusting a projection areas of the fourth partial image projected by the third projector based on the projection area of the third partial image, and after transmission of the third adjustment instruction, transmits, for each of the fifth partial images to a fourth projector that is a projector that projects the fifth partial image, a fourth adjustment instruction of adjusting a projection areas of the fifth partial image projected by the fourth projector based on any of the fourth partial images.

The aspect described above allows adjustment of the projection areas of the plurality of fourth partial images and the projection areas of the plurality of fifth partial images based directly or indirectly on the projection area of the third partial image.

An aspect of a multi-projection system according to the invention is directed to a multi-projection system that projects an image on a projection surface, the image formed of a plurality of partial images including a first partial image, a second partial image, and a third partial image, the multi-projection system including a first projector that projects the first partial image on the projection surface, a second projector that projects the second partial image on the projection surface, and a third projector that projects the third partial image on the projection surface. The third projector transmits to the first projector a first adjustment instruction of adjusting a projection area of the first partial image based on a projection area of the third partial image, and the first projector adjusts the projection area of the first partial image based on the projection area of the third partial image in accordance with the first adjustment instruction. The third projector, after transmitting the first adjustment instruction, transmits to the second projector a second adjustment instruction of adjusting a projection area of the second partial image based on the projection area of the first partial image, and the second projector adjusts the projection area of the second partial image based on the projection area of the first partial image in accordance with the second adjustment instruction.

The aspect described above allows adjustment of the projection areas of the first and second partial images based directly or indirectly on the projection area of the third partial image. Therefore, for example, a user's adjustment of the projection area of the third partial image allows adjustment of the projection areas of the first and second partial images based on the adjusted projection area of the third partial image. The effort of the adjustment of the projection areas can therefore be reduced as compared with a case where the user adjusts all the projection areas of the first to third partial images.

An aspect of a method for controlling a projector according to the invention is directed to a method for controlling a projector that is allowed to belong to a multi-projection system that projects an image on a projection surface, the image formed of a plurality of partial images including a first partial image, a second partial image, and a third partial image, the method including projecting the third partial image on the projection surface, transmitting, to a first projector that projects the first partial image, a first adjustment instruction of adjusting a projection area of the first partial image based on a projection area of the third partial image, and transmitting, to a second projector that projects the second partial image after transmitting the first adjustment instruction, a second adjustment instruction of adjusting a projection area of the second partial image based on the projection area of the first partial image.

The aspect described above allows adjustment of the projection areas of the first and second partial images based directly or indirectly on the projection area of the third partial image.

Therefore, for example, a user's adjustment of the projection area of the third partial image allows adjustment of the projection areas of the first and second partial images based on the adjusted projection area of the third partial image.

The effort of the adjustment of the projection areas can therefore be reduced as compared with a case where the user adjusts all the projection areas of the first to third partial images.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
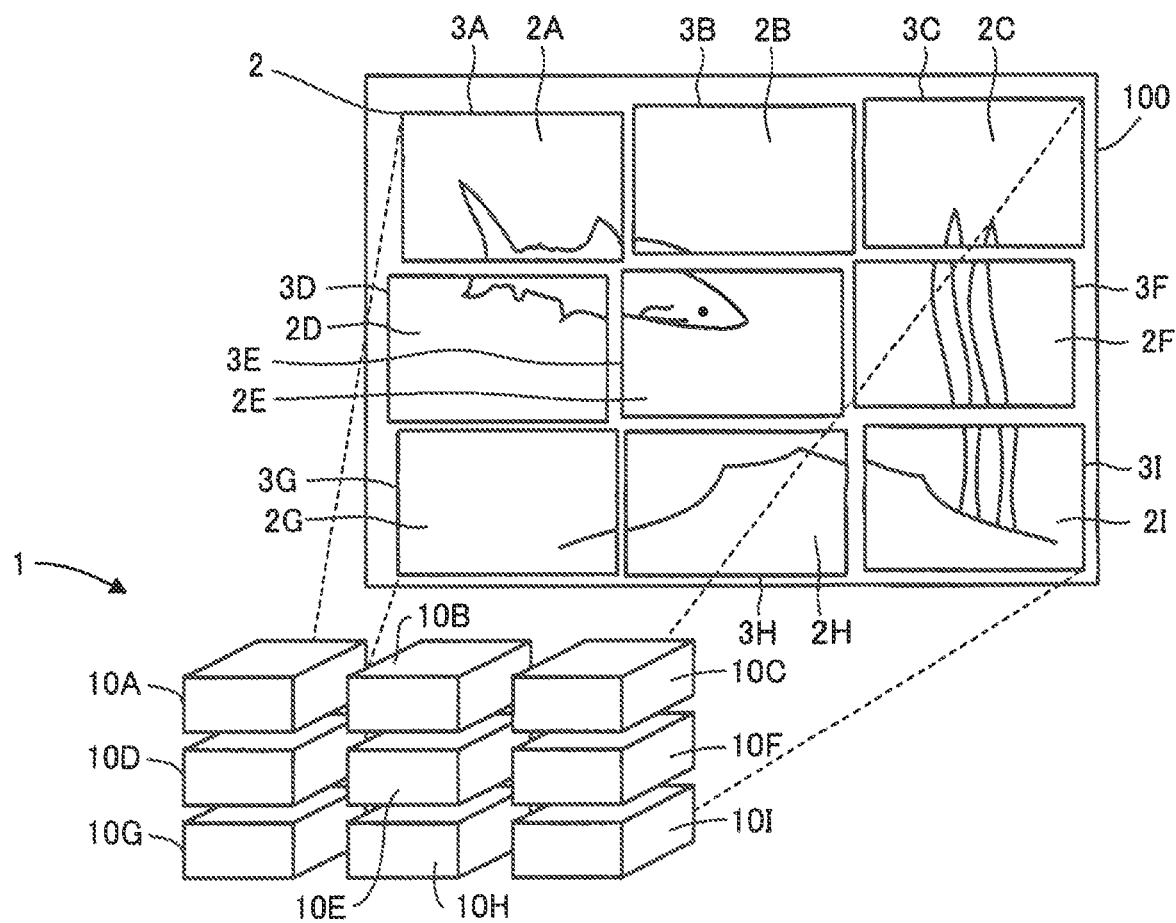
FIG. 1 shows a multi-projection system including projectors according to a first embodiment.

Embodiments according to the invention will be described below with reference to the drawings. In the drawings, the dimension and scale of each portion differ from actual values as appropriate. Further, the embodiments described below are preferable specific examples of the invention. A variety of technically preferable restrictions are therefore imposed on the embodiments. The scope of the invention is, however, not limited to any of the restricted forms unless the following description particularly states that the restriction is imposed on the invention.

First Embodiment

FIG. 1 shows a multi-projection system 1 including projectors according to a first embodiment. The multi-projection system 1 includes projectors 10A to 10I. The projectors 10A to 10I can communicates with each other. The projectors 10A to 10I form, for example, a star-topology network. The network formed by the projectors 10A to 10I (hereinafter also simply referred to as "network") is not limited to a star-topology network and can be changed as appropriate.

The multi-projection system 1 projects an image 2 formed of partial images 2A to 2I on a projection surface 100. The partial images 2A to 2I are an example of a plurality of partial images. The partial images 2A to 2I are not limited to those shown in FIG. 1 and can be changed as appropriate. For example, in an adjustment situation in which the projection areas of the partial images are adjusted in accordance with adjustment instructions that will be described later, the partial images 2A to 2I are each entirely drawn in a single color (any of red, blue, and green, for example). In this case, partial images adjacent to each other are drawn in colors different from each other so that the adjacent images can be distinguished from each other in terms of color.

The partial image 2A is projected from the projector 10A on the projection surface 100. The partial image 2A is an example of a third partial image. The partial image 2B is projected from the projector 10B. The partial image 2B is an example of a first partial image and a fourth partial image. The partial image 2C is projected from the projector 10C. The partial image 2C is an example of a second partial image and a fifth partial image. The partial images 2D, 2E, 2F, 2G, 2H, and 2I are projected from the projectors 10D, 10E, 10F, 10G, 10H, and 10I, respectively. The partial image 2D is an example of the fourth partial image. The partial images 2E and 2G are each an example of the fifth partial image.

The plurality of partial images 2A to 2I include the third partial image (partial image 2A), a plurality of the fourth partial images (partial images 2B and 2D), and a plurality of the fifth partial images (partial images 2C, 2E, and 2G).

The projector 10B is an example of a first projector that is the source from which the first partial image is projected and a third projector that is the source from which the fourth partial image is projected. The projector 10C is an example of a second projector that is the source from which the second partial image is projected and a fourth projector that is the source from which the fifth partial image is projected. The projector 10D is an example of the third projector. The projectors 10E and 10G are each an example of the fourth projector. The number of third projectors is not limited to two and only needs to be at least two. The number of fourth projectors is not limited to three and only needs to be at least two.

The projection surface 100 has projection areas 3A to 3I. The projection area 3A is the area where the partial image 2A is projected. The projection area 3B is the area where the partial image 2B is projected. The projection area 3C is the area where the partial image 2C is projected. The projection areas 3D, 3E, 3F, 3G, 3H, and 3I are the areas where the partial images 2D, 2E, 2F, 2G, 2H, and 2I are projected, respectively.

FIG. 1 shows a situation in which the multi-projection system 1 has not adjusted the projection areas 3A to 3I since a user roughly arranged the projectors 10A to 10I. The image 2 is therefore disarranged in FIG. 1.

In the multi-projection system 1, any of the projectors 10A to 10I serves as a main projector (master projector), and the remaining projectors serve as subordinate projectors (slave projectors). In the following description, it is assumed that the projector 10A is the main projector and the projectors 10B to 10I are the subordinate projectors. The main projector is not limited to the projector 10A and may instead be any of the other projectors.

The main projector transmits instructions of adjusting the projection areas to the subordinate projectors. The subordinate projectors adjust the projection areas in accordance with the adjustment instructions. The subordinate projectors each adjust the position of a zoom lens (see FIG. 3) used to project a partial image to adjust the size of the projection area. The subordinate projectors each shift the position of a projection system (see FIG. 3), such as a lens, used to project a partial image to adjust the position of the projection area.

For example, it is assumed that the user has adjusted the position and size of the projection area 3A associated with the main projector 10A. The main projector 10A transmits the adjustment instructions to the subordinate projectors 10B to 10I in such a way that the projection area 3A adjusted by the user is used as a direct or indirect reference to adjust the remaining projection areas (projection areas 3B to 3I). The subordinate projectors 10B to 10I each adjust the projection area in accordance with the adjustment instructions with direct or indirect reference to the projection area 3A.

Specifically, the main projector 10A first transmits the adjustment instructions to the subordinate projectors 10B and 10D. The adjustment instruction to the subordinate projector 10B is an instruction of adjusting the projection area 3B based on the projection area 3A, in more detail, with reference to the projection area 3A. The adjustment instruction to the subordinate projector 10D is an instruction of adjusting the projection area 3D based on the projection area 3A, in more detail, with reference to the projection area 3A. The adjustment instruction to the subordinate projector 10B is an example of a first adjustment instruction and a third adjustment instruction. The adjustment instruction to the subordinate projector 10D is an example of the third adjustment instruction.

The subordinate projector 10B adjusts the projection area 3B in accordance with the adjustment instruction and with reference to the projection area 3A. The subordinate projector 10D adjusts the projection area 3D in accordance with the adjustment instruction and with reference to the projection area 3A.

Having transmitted the adjustment instructions to the subordinate projectors 10B and 10D, the main projector 10A transmits the adjustment instructions to the projectors 10C, 10E, and 10G. The adjustment instruction to the subordinate projector 10C is an instruction of adjusting the projection area 3C based on the projection area 3B, in more detail, with reference to the projection area 3B. The adjustment instruction to the subordinate projector 10E is an instruction of adjusting the projection area 3E based on the projection area 3D, in more detail, with reference to the projection area 3D. The adjustment instruction to the subordinate projector 10E may instead be an instruction of adjusting the projection area 3E with reference to the projection area 3B. The adjustment instruction to the subordinate projector 10G is an instruction of adjusting the projection area 3G based on the projection area 3D, in more detail, with reference to the projection area 3D.

The projection areas 3B and 3D, which serve as the adjustment reference, have been adjusted with reference to the projection area 3A. The adjustment instruction to the subordinate projector 10C, the adjustment instruction to the subordinate projector 10E, and the adjustment instruction to the subordinate projector 10G each therefore mean an instruction of adjusting the projection area with indirect reference to the projection area 3A (based on projection area 3A).

The adjustment instruction to the subordinate projector 10C is an example of a second adjustment instruction and a fourth adjustment instruction. The adjustment instruction to the subordinate projector 10E and the adjustment instruction to the subordinate projector 10G are each an example of the fourth adjustment instruction.

The main projector 10A subsequently transmits the adjustment instructions to the subordinate projectors 10F and 10H. The adjustment instruction to the subordinate projector 10F is an instruction of adjusting the projection area 3F based on the projection area 3E, in more detail, with reference to the projection area 3E. The adjustment instruction to the subordinate projector 10F may instead be an instruction of adjusting the projection area 3F with reference to the projection area 3C. The adjustment instruction to the subordinate projector 10H is an instruction of adjusting the projection area 3H based on the projection area 3G, in more detail, with reference to the projection area 3G. The adjustment instruction to the subordinate projector 10H may instead be an instruction of adjusting the projection area 3H with reference to the projection area 3E.

The projection areas 3C, 3E, and 3G, which serve as the adjustment reference, have been adjusted with indirect reference to the projection area 3A. The adjustment instruction to the subordinate projector 10F and the adjustment instruction to the subordinate projector 10H each therefore also mean an instruction of adjusting the projection area with indirect reference to the projection area 3A (based on projection area 3A).

The main projector 10A subsequently transmits to the projector 10I the adjustment instruction of adjusting the projection area 3I based on the projection area 3H, in more detail, with reference to the projection area 3H. The adjustment instruction to the subordinate projector 10I may instead be an instruction of adjusting the projection area 3I with reference to the projection area 3F.

The projection areas 3H and 3F, which serve as the adjustment reference, have been adjusted with indirect reference to the projection area 3A. The adjustment instruction to the subordinate projector 10I therefore also means an instruction of adjusting the projection area with indirect reference to the projection area 3A.

Figure 2:
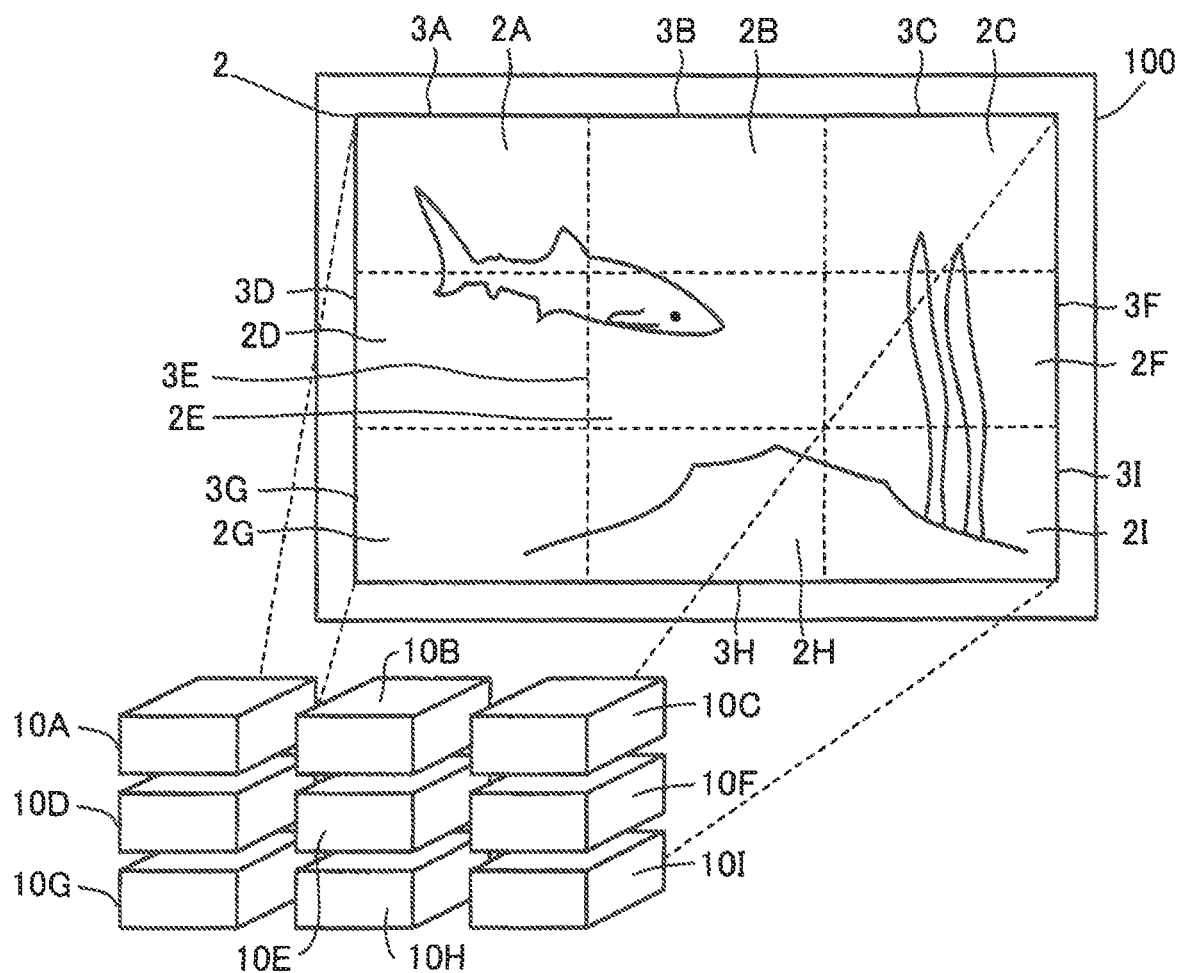
FIG. 2 shows a state in which projection areas other than a reference projection area have been adjusted with reference to the reference projection area.

FIG. 2 shows a state in which the projection areas other than the projection area 3A (projection areas 3B to 3I) have been adjusted with direct or indirect reference to the projection area 3A.

Figure 3:
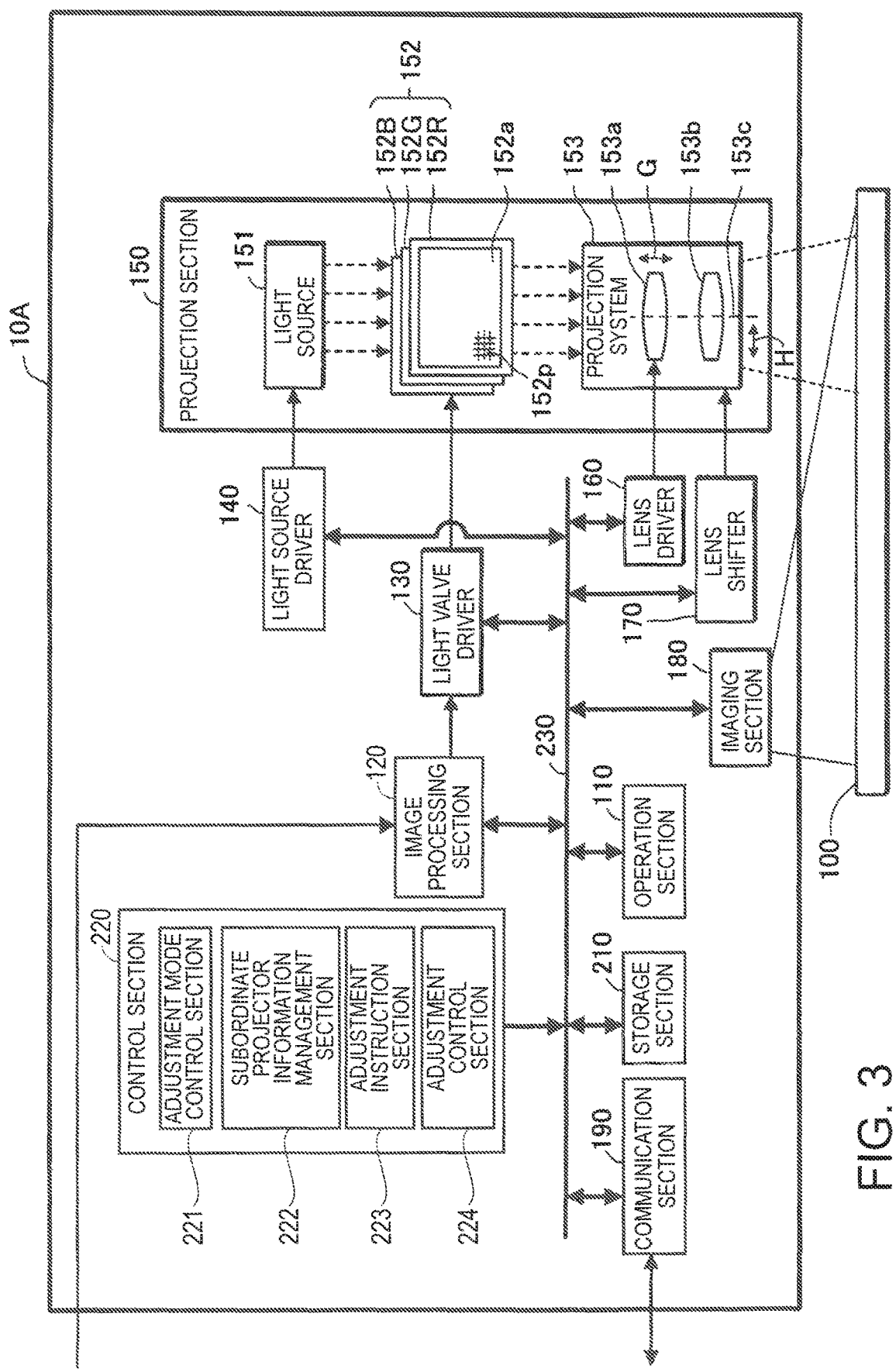
FIG. 3 diagrammatically shows one of the projectors.

FIG. 3 diagrammatically shows the projector 10A.

The projector 10A includes an operation section 110, an image processing section 120, a light valve driver 130, a light source driver 140, a projection section 150, a lens driver 160, a lens shifter 170, an imaging section 180, a communication section 190, a storage section 210, a control section 220, and a bus 230. The projection section 150 includes a light source 151, three liquid crystal light valves 152 (152R, 152G, and 152B), which are an example of a light modulator, and a projection system 153.

The projectors 10A to 10I have the same configuration. The projectors 10B to 10I therefore each include the operation section 110, the image processing section 120, the light valve driver 130, the light source driver 140, the projection section 150, the lens driver 160, the lens shifter 170, the imaging section 180, the communication section 190, the storage section 210, the control section 220, and the bus 230, as does the projector 10A.

The following description will be made primarily of the projector 10A, and the projectors 10B to 10I will be described as required.

The operation section 110, the image processing section 120, the light valve driver 130, the light source driver 140, the lens driver 160, the lens shifter 170, the imaging section 180, the communication section 190, the storage section 210, and the control section 220 can communicate with each other via the bus 230.

The operation section 110 is formed, for example, of a variety of operation buttons or operation keys or a touch panel. The operation section 110 receives the user's input operation. The operation section 110 may, for example, be a remote control that transmits information according to the user's input operation wirelessly or via a wire. In this case, the projector 10A includes a receiver that receives the information transmitted by the remote control. The remote control includes a variety of operation buttons or operation keys or a touch panel that receives the user's input operation.

The image processing section 120 performs image processing on image information to produce an image signal. For example, the image processing section 120 performs image processing on image information received from an image supply apparatus, such as a personal computer (PC), to produce an image signal.

The light valve driver 130 drives the liquid crystal light valves 152 (152R, 152G, and 152B) based on the image signal produced by the image processing section 120.

The light source driver 140 drives the light source 151. For example, when the operation section 110 receives "power-on operation," the light source driver 140 causes the light source 151 to emit light.

The projection section 150 projects a projection image (partial image 2A) on the projection surface 100. The projection system 153 includes a zoom lens 153a and a projection lens 153b. The optical axis of the zoom lens 153a coincides with the optical axis of the projection lens 153b. In FIG. 3, an "optical axis 153c" represents the optical axis of the zoom lens 153a and the optical axis of the projection lens 153b. In the projection section 150, the liquid crystal light valves 152 modulate the light emitted from the light source 151 to form projection image light (partial image light), and the projection system 153 enlarges and projects the projection image light.

The light source 151 is a xenon lamp, an ultrahigh-pressure mercury lamp, a light emitting diode (LED), a laser light source, or any other light source. The light emitted from the light source 151 passes through an optical integration system that is not shown, which reduces variation in the luminance distribution of the light, and the resultant light is then separated by a color separation system that is not shown into color light components of red (R), green (G), and blue (B), which are the three primary colors of light. The RGB color light components are incident on the liquid crystal light valves 152R, 152G, and 152B, respectively.

The liquid crystal light valves 152 are each formed, for example, of a liquid crystal panel in which a pair of transparent substrates encapsulate a liquid crystal material. A rectangular pixel area 152a, which is formed of a plurality of pixels 152p arranged in a matrix, is formed in each of the liquid crystal light valves 152. In each of the liquid crystal light valves 152, drive voltage is applicable to the liquid crystal material for each of the pixels 152p. The light valve driver 130 applies drive voltage according to the image signal inputted from the image processing section 120 to each of the pixels 152p, and the pixel 152p has optical transmittance set in accordance with the image signal. The light emitted from the light source 151 is therefore modulated when passing through the pixel areas 152a to form images according to the image signal (image information) on a color basis.

The color images are combined with one another by a light combining system that is not shown for each of the pixels 152p into projection image light (partial image 2A) that is color image light (color image). The projection system 153 enlarges the partial image 2A and projects the enlarged partial image 2A on the projection surface 100.

The lens driver 160 can change the zooming state of the zoom lens 153a. The lens driver 160 moves the zoom lens 153a in a direction G along the optical axis 153c to change the zooming state of the zoom lens 153a. The size of the projection area 3A on the projection surface 100 changes in accordance with the zooming state of the zoom lens 153a.

The lens shifter 170 can shift the projection system 153 in a direction H, which intersects the optical axis 153c (direction perpendicular to optical axis 153c, for example). The lens shifter 170 can further shift the projection system 153 in the direction perpendicular both to the optical axis 153c and the direction H. The position of the projection area 3A on the projection surface 100 changes in accordance with the shift state of the projection system 153.

The imaging section 180 captures an image of the projection surface 100 to produce captured image information representing the captured image.

Figure 4:
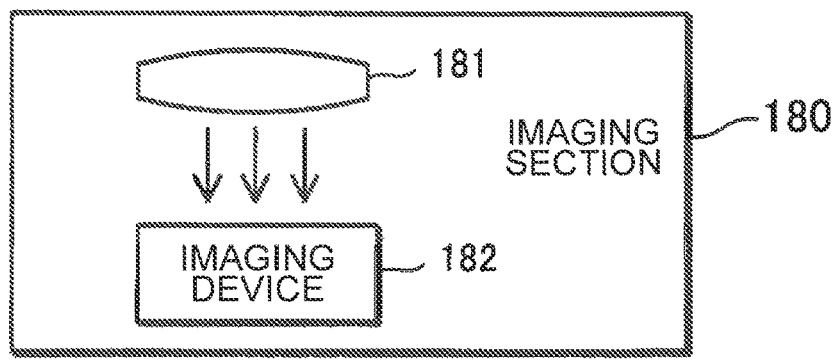
FIG. 4 shows an example of an imaging section.

FIG. 4 shows an example of the imaging section 180. The imaging section 180 is a camera including an optical system 181, such as a lens, an imaging device 182, which converts light collected by the optical system 181 into an electric signal, and other components. The imaging device 182 is, for example, a CCD (charge coupled device) image sensor or a CMOS (complementary metal oxide semiconductor) image sensor.

Referring back to FIG. 3, the communication section 190 can communicate, for example, with another projector via a wire or wirelessly.

The storage section 210 is a computer readable recording medium. The storage section 210 stores a program that specifies the action of the projector 10A and a variety of pieces of information.

The control section 220 is a computer, such as a CPU (central processing unit). The control section 220 may be formed of one or more processors. The control section 220 reads and executes the program stored in the storage section 210 to achieve an adjustment mode control section 221, a subordinate projector information management section 222, an adjustment instruction section 223, and an adjustment control section 224. The control section 220 formed of one or more processors may instead achieve the adjustment mode control section 221, the subordinate projector information management section 222, the adjustment instruction section 223, and the adjustment control section 224.

The adjustment mode control section 221 controls an adjustment mode of the projector 10A. The adjustment mode control section 221 alternatively sets a "main projector mode" and a "subordinate projector mode" as the adjustment mode. The "main projector mode" is hereinafter also referred to as a "main mode," and the "subordinate projector mode" is hereinafter also referred to as a "subordinate mode."

In the case where the adjustment mode is the "main mode," the projector 10A acts as the main projector. In the case where the adjustment mode is the "subordinate mode," the projector 10A acts as a subordinate projector. The adjustment mode is set at the "subordinate mode" as a default. When the operation section 110 receives, for example, "main mode setting operation," the adjustment mode control section 221 sets the adjustment mode to be the "main mode."

The subordinate projector information management section 222 acts in the case where the adjustment mode is the "main mode." The subordinate projector information management section 222 stores information on the subordinate projectors (hereinafter also referred to as "subordinate projector information") in the storage section 210.

The subordinate projector information contains communication information necessary for the communication between the main projector and each subordinate projector, a relative relationship information representing a target relative relationship among the projection areas 3A to 3I (relative positional relationship and relative size relationship), and a color information representing the colors of the partial images 2A to 2I in the adjustment.

The communication information is, for example, an IP (Internet protocol) address of each subordinate projector. The communication information may be obtained by the subordinate projector information management section 222 from the network or may be inputted by the user via the operation section 110.

The relative relationship information is produced based on information inputted by the user via the operation section 110.

The color information may be inputted by the user via the operation section 110 or may be produced by the subordinate projector information management section 222 based on the relative relationship information. The color information is so set that the colors of adjacent ones of the partial images 2A to 2I on the projection surface 100 differ from each other.

The adjustment instruction section 223 acts in the case where the adjustment mode is the "main mode." The adjustment instruction section 223 uses the subordinate projector information to produce the adjustment instructions described above on a subordinate projector basis. The adjustment instructions each include reference information, specifying information, relativity information, a position adjustment instruction, and a size adjustment instruction.

The reference information is information for identifying a partial image that serves as the adjustment reference (hereinafter also referred to as "reference partial image"). The reference information represents at least the color of the reference partial image. For example, the reference information may represent the color of the reference partial image, the color of an adjusted partial image that is in contact with the reference partial image, and the positional relationship between the adjusted partial image and the reference partial image. The adjustment instruction section 223 produces the reference information by using the color information and the relative relationship information stored in the storage section 210.

The specifying information specifies the color of a partial image to be projected by a subordinate projector having received the adjustment instruction (hereinafter also referred to as "adjustment partial image"). The color of an adjustment partial image specified by the specifying information differs from the color of the reference partial image indicated by the reference information. The adjustment instruction section 223 uses the color information stored in the storage section 210 to produce the specifying information.

The relativity information represents the relative positional relationship and the relative size relationship between the reference partial image projection area and an adjustment partial image target projection area.

The relative positional relationship may, for example, be the relationship representing the situation in which an adjustment partial image target projection area is on the right of the reference partial image projection area. The relative positional relationship is not limited to the relationship representing the situation in which an adjustment partial image target projection area is on the right of the reference partial image projection area and can be changed as appropriate.

The relative size relationship may, for example, be the relationship representing the situation in which the size of the reference partial image is equal to the size of the adjustment partial image. The relative size relationship is not limited to the relationship representing the situation in which the size of the reference partial image is equal to the size of the adjustment partial image and can be changed as appropriate.

The adjustment instruction section 223 uses the relative relationship information stored in the storage section 210 to produce the relativity information.

The position adjustment instruction is an instruction of adjusting the position of an adjustment partial image projection area based on the position of the reference partial image projection area. The size adjustment instruction is an instruction of adjusting the size of the adjustment partial image projection area based on the size of the reference partial image projection area.

The adjustment instruction section 223 produces the position adjustment instruction and the size adjustment instruction in accordance with an instruction received by the operation section 110.

For example, when the user operates the operation section 110 to input an instruction of adjusting the size and position of a projection area, the adjustment instruction section 223 causes the adjustment instruction to contain the position adjustment instruction and the size adjustment instruction.

When the user operates the operation section 110 to input an instruction of adjusting only the position of a projection area without changing the size thereof, the adjustment instruction section 223 causes the adjustment instruction to contain the position adjustment instruction but no size adjustment instruction.

When the user operates the operation section 110 to input an instruction of adjusting only the size of a projection area without changing the position thereof, the adjustment instruction section 223 causes the adjustment instruction to contain the size adjustment instruction but no position adjustment instruction.

In the adjustment instruction transmitted to the projector 10B, the reference information is an example of first specific information, the specifying information is an example of first specifying information, the relativity information is an example of first relative positional information, the position adjustment instruction is an example of first position adjustment instruction, and the size adjustment instruction is an example of first size adjustment instruction.

In the adjustment instruction transmitted to the projector 10C, the position adjustment instruction is an example of second position adjustment instruction and the size adjustment instruction is an example of second size adjustment instruction.

The adjustment instruction section 223 uses the communication information stored in the storage section 210 to transmit the adjustment instructions to the subordinate projectors via the communication section 190.

In the present embodiment, the adjustment instruction section 223 first transmits the adjustment instructions to the projectors 10B and 10D. Having transmitted the adjustment instructions to the projectors 10B and 10D, in more detail, after reception of completion notice that will be described later from each of the projectors 10B and 10D, the adjustment instruction section 223 transmits the adjustment instructions to the projectors 10C, 10E, and 10G. After reception of completion notice that will be described later from each of the projectors 10C, 10E, and 10G, the adjustment instruction section 223 transmits the adjustment instructions to the projectors 10F and 10H. After reception of completion notice that will be described later from each of the projectors 10F and 10H, the adjustment instruction section 223 transmits the adjustment instruction to the projector 10I.

It is noted that the adjustment instruction section 223 starts the transmission of the adjustment instructions after the projection section 150 projects the partial image 2A having a color specified by the color information stored in the storage section 210.

The adjustment control section 224 acts in the case where the adjustment mode is the "subordinate mode." The adjustment control section 224 receives the adjustment instruction from the main projector via the communication section 190. The adjustment control section 224 adjusts the relative relationship between the reference partial image projection area and the projection area 3A, where the partial image 2A is projected, in accordance with the adjustment instruction received from the main projector.

The adjustment control section 224 causes the projection section 150 to project the partial image 2A having a color specified by the specifying information contained in the adjustment instruction and subsequently causes the imaging section 180 to capture an image of the projection surface 100 to produce captured image information. In a case where the imaging section 180 has a zooming function, the adjustment control section 224 preferably adjusts the zooming function of the imaging section 180 in such a way that the projection surface 100 is enlarged in the captured image indicated by the captured image information. The reason for this is that the difficulty in precisely identifying the size and position of a partial image in a captured image increases as the size of the projection surface 100 shown in a captured image decreases.

The adjustment control section 224 identifies the actual relative relationship between the reference partial image identified by the reference information contained in the adjustment instruction and the adjustment partial image (partial image 2A) based on the captured image information.

In the case where the adjustment instruction contains the position adjustment instruction, the adjustment control section 224 controls the lens shifter 170 to cause it to shift the projection system 153 in such away that the actual positional relationship between the reference partial image and the adjustment partial image is equal to the relative positional relationship indicated by the relativity information.

In the case where the adjustment instruction contains the size adjustment instruction, the adjustment control section 224 controls the lens driver 160 to cause it to change the position of the zoom lens 153a in such away that the actual size relationship between the reference partial image and the adjustment partial image is equal to the relative size relationship indicated by the relativity information.

The action of the multi-projection system 1 will next be described. It is assumed in the following description that the projectors 10A to 10I project no partial images in an initial state.

Figure 5:
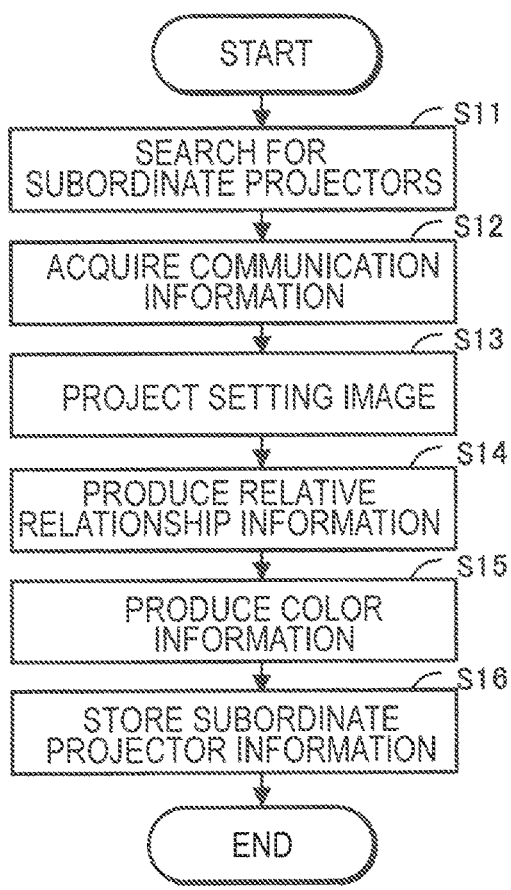
FIG. 5 is a flowchart for primarily describing the action of a subordinate projector information management section.

FIG. 5 is a flowchart for primarily describing the action of the subordinate projector information management section 222 of the main projector 10A, specifically, how the subordinate projector information management section 222 acquires the communication information, produces the relative relationship information, and produces the color information.

When the operation section 110 receives, for example, main mode setting operation, the subordinate projector information management section 222 searches for subordinate projectors in the network to which the projector 10A is connected (step S11).

The subordinate projector information management section 222 subsequently acquires the communication information (IP address of subordinate projector) from each subordinate projector found in the search (step S12).

The subordinate projector information management section 222 subsequently prompts the user to set a target relative relationship among the projection areas 3A to 3I (hereinafter referred to as "target relationship").

In the present embodiment, the subordinate projector information management section 222 causes the projection section 150 to project a setting image for setting the target relationship (step S13). Specifically, the subordinate projector information management section 222 outputs setting image information representing a setting image to the image processing section 120 to cause the projection section 150 to project the setting image.

Figure 6:
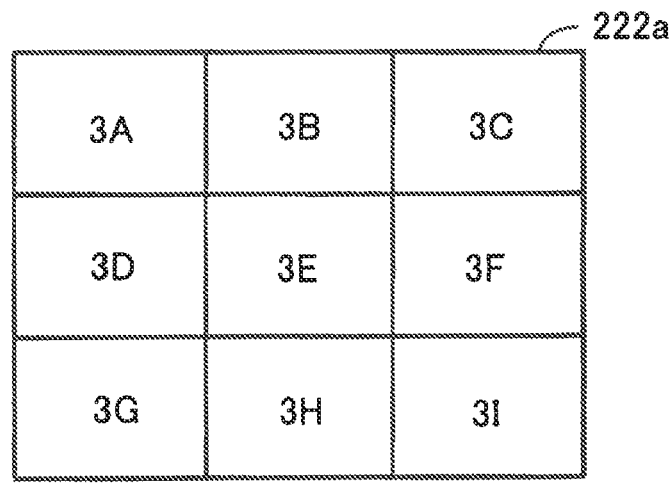
FIG. 6 shows an example of a setting image.

FIG. 6 shows an example of a setting image 222a. The setting image 222a shown in FIG. 6 is used in a case where the target relationship is set in a situation in which the nine projection areas 3A to 3I are so arranged as to be adjacent to each other in three vertical columns and three horizontal rows (3×3). In FIG. 6, symbols (3A to 3I) with which the projection areas are labeled are used as information for identifying the projection areas, but the information for identifying the projection areas is not limited thereto, and may, for example, be information that identifies a projector that projects a partial image in each of the projection areas (projector name, for example).

The user operates the operation section 110 while looking at the setting image 222a to set the arrangement of the nine projection areas in the three vertical columns and three horizontal rows. For example, the user operates the operation section 110 to change the arrangement shown in FIG. 6 (for example, swap the position of the projection area 3B and the position of the projection area 3C) to set the arrangement of the nine projection areas in the three vertical columns and three horizontal rows.

Further, the user operates the operation section 110 while looking at the setting image 222a to set the relative size relationship among the nine projection areas. In the setting image 222a shown in FIG. 6, the nine projection areas 3A to 3I have the same size and shape. For example, the user operates the operation section 110 to set the relative size relationship among the nine projection areas 3A to 3I shown in FIG. 6.

The subordinate projector information management section 222 produces the relative relationship information representing the target relationship set by using the setting image 222a (step S14). It is assumed in the following description that the relative relationship information representing the arrangement and the size relationship shown in FIG. 6 has been produced.

The subordinate projector information management section 222 subsequently produces the color information by referring to the relative relationship information (step S15). The subordinate projector information management section 222 produces the color information in such away that partial images adjacent to each other on the projection surface 100 have difference colors.

It is assumed in the following description that color information 222b representing the relationship shown in FIG. 7 has been produced. Specifically, the subordinate projector information management section 222 produces color information representing that the partial images 2A, 2E, and 2I are drawn in red, the partial images 2C, 2D, and 2H are drawn in green, and the partial images 2B, 2F, and 2G are drawn in blue. The color information 222b may represent a color relationship different from the relationship shown in FIG. 7.

The subordinate projector information management section 222 subsequently stores the communication information acquired in step S12, the relative relationship information produced in step S14, and the color information produced in step S15 as the subordinate projector information in the storage section 210 (step S16).

Having completed the setting of the target relationship by using, for example, the setting image 222a shown in FIG. 6, the user roughly adjusts the positions of the projectors 10A to 10I to cause the relative relationship among the projection areas 3A to 3I to approach the target relationship shown in FIG. 6.

The user subsequently adjusts the main projector 10A with high precision to cause the projection area 3A, where the partial image 2A is projected, to coincide with the target projection area.

The user subsequently operates the operation section 110 to input an adjustment start instruction to the projector 10A. The adjustment instruction section 223 starts acting in response to the input of the adjustment start instruction.

Figure 8:
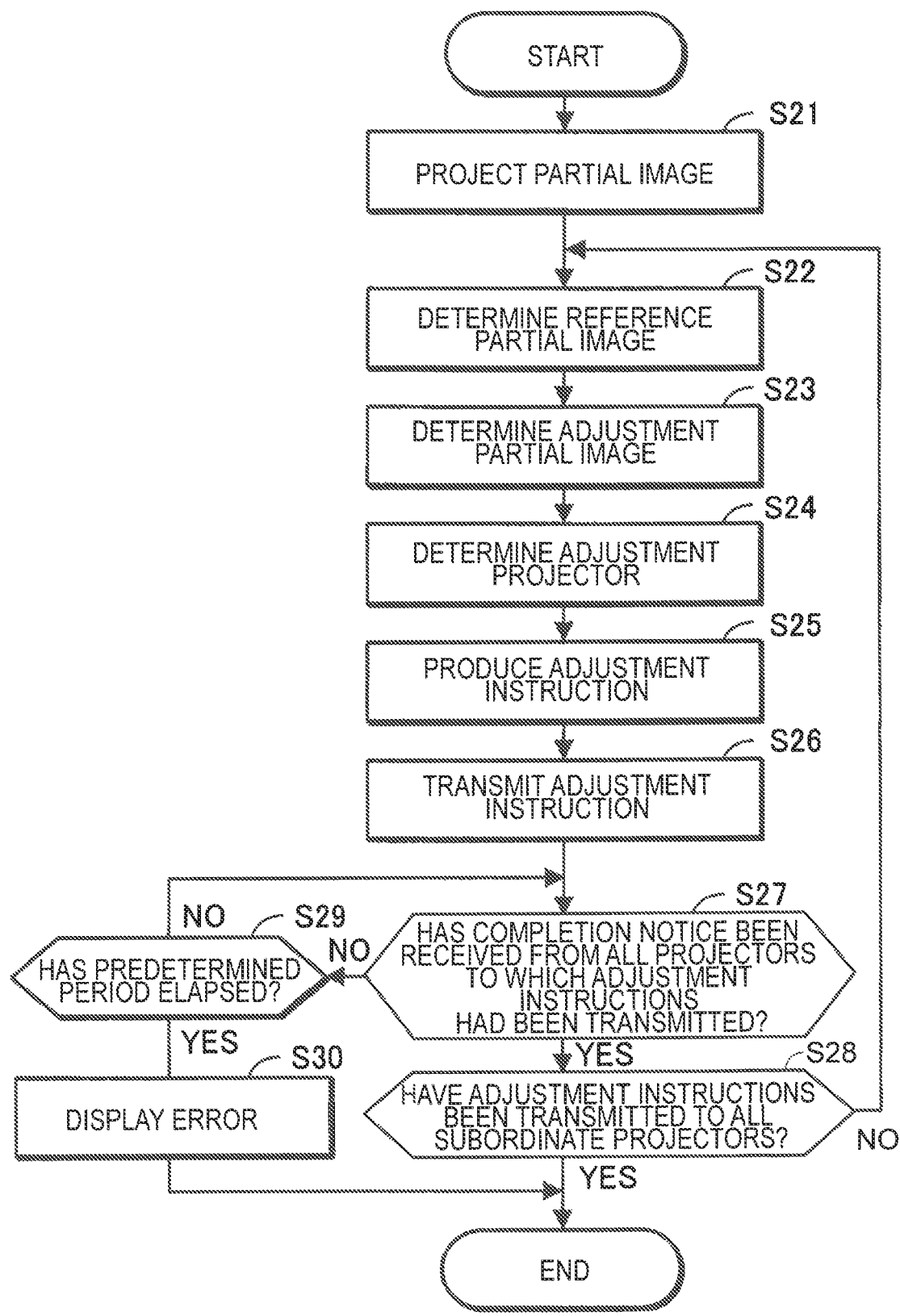
FIG. 8 is a flowchart for primarily describing the action of an adjustment instruction section.

FIG. 8 is a flowchart for primarily describing the action of the adjustment instruction section 223 in the main projector 10A.

The adjustment instruction section 223 first refers to the color information stored in the storage section 210 and causes the projection section 150 to project the partial image 2A having the color that the color information represents as the color of the partial image 2A, specifically, red (entirely red partial image) (step S21). Since the projection area of the partial image 2A has been adjusted by the user, the partial image 2A is projected in the target projection area 3A.

The adjustment instruction section 223 subsequently determines the reference partial image (step S22). In a case where step S21 is followed by step S22, the adjustment instruction section 223 determines the partial image 2A projected in the target projection area 3A to be the reference partial image.

The adjustment instruction section 223 subsequently refers to the relative relationship information stored in the storage section 210 and determines a partial image adjacent to the reference partial image out of partial images not having been adjusted as an adjustment partial image (step S23). In the case where the reference partial image is the partial image 2A, the adjustment instruction section 223 determines the partial images 2B and 2D as the adjustment partial image.

The adjustment instruction section 223 subsequently determines the subordinate projector that projects the adjustment partial image as an adjustment projector (step S24). In the case where the adjustment partial image is the partial images 2B and 2D, the adjustment instruction section 223 determines the subordinate projectors 10B and 10D to be the adjustment projector.

The adjustment instruction section 223 subsequently refers to the subordinate projector information stored in the storage section 210 and produces the adjustment instructions for the adjustment projectors (step S25).

In step S25, the adjustment instruction section 223 produces, as the adjustment instruction for the subordinate projector 10B, an adjustment instruction containing reference information representing red, specifying information specifying blue, relativity information showing that the position of the adjustment partial image is on the right of the position of the red image and the size of the adjustment partial image is equal to the size of the red image, a position adjustment instruction, and a size adjustment instruction.

The adjustment instruction section 223 further produces, as the adjustment instruction for the subordinate projector 10D, an adjustment instruction containing reference information representing red, specifying information specifying green, relativity information showing that the position of the adjustment partial image is below the position of the red image and the size of the adjustment partial image is equal to the size of the red image, a position adjustment instruction, and a size adjustment instruction.

The adjustment instruction section 223 subsequently transmits the adjustment instructions via the communication section 190 to the adjustment projectors (step S26). In the case where the adjustment projectors are the subordinate projectors 10B and 10D, the adjustment instruction section 223 transmits the adjustment instructions to the subordinate projectors 10B and 10D via the communication section 190.

Figure 9:
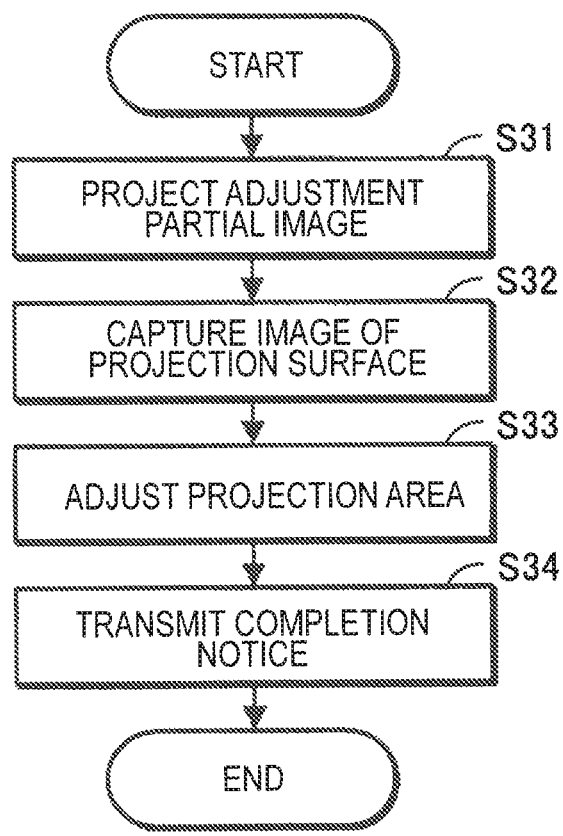
FIG. 9 is a flowchart for describing the action of an adjustment projector.

The adjustment projectors, when they receive the adjustment instructions, adjust the partial image projection areas in accordance with the adjustment instructions. FIG. 9 is a flowchart for describing the action of each of the adjustment projectors that adjust the partial image projection areas in accordance with an adjustment instructions.

In each of the adjustment projectors, the adjustment control section 224, when it receives the adjustment instruction via the communication section 190, causes the projection section 150 to project a partial image having a color specified by the specifying information contained in the adjustment instruction (adjustment partial image) (step S31). The adjustment control section 224 outputs image information representing the adjustment partial image to the image processing section 120 to cause the projection section 150 to project the adjustment partial image.

The projector 10B that is one of the adjustment projectors projects the partial image 2B entirely drawn in blue, and the projector 10D that is the other adjustment projector projects the partial image 2D entirely drawn in green.

The adjustment control section 224 subsequently causes the imaging section 180 to capture an image of the projection surface 100 (step S32). Having captured an image of the projection surface 100, the imaging section 180 produces captured image information representing a captured image containing the red partial image 2A, the blue partial image 2B, and the green partial image 2D.

The adjustment control section 224 subsequently uses the captured image information and the adjustment instruction to adjust the projection area of the adjustment partial image (step S33).

In step S33, the adjustment control section 224 identifies the reference partial image, which is identified by the reference information contained in the adjustment instruction, in the captured image. The adjustment control section 224 further identifies as the adjustment partial image the partial image having the color specified by the specifying information contained in the adjustment instruction in the captured image. In a case where the captured image contains a plurality of partial images having the color specified by the specifying information, the adjustment control section 224 identifies as the adjustment partial image, for example, a partial image closest to the reference partial image out of the plurality of partial images having the color specified by the specifying information.

The adjustment performed by the projector 10B, which is one of the adjustment projectors, will first be described.

In the projector 10B, the adjustment control section 224 identifies as the reference partial image the partial image 2A drawn in red indicated by the reference information in the captured image.

The adjustment control section 224 subsequently identifies as the adjustment partial image the partial image 2B drawn in blue specified by the specifying information in the captured image.

The adjustment control section 224 subsequently adjusts the projection area 3B of the adjustment partial image to reduce the difference between the relationship between the adjustment partial image and the reference partial image in the captured image and the relationship indicated by the relativity information (the adjustment partial image is on the right of the red image and has the same size of red image).

For example, the adjustment control section 224 adjusts the position of the zoom lens 153*a* by using the lens driver 160 to reduce the difference in size between the adjustment partial image (partial image 2B) and the reference partial image (partial image 2A). The adjustment control section 224 uses the number of pixels that form each of the images as the size of the image.

In a case where the number of pixels that form the adjustment partial image in the captured image is greater than the number of pixels that form the reference partial image in the captured image, the adjustment control section 224 moves the zoom lens 153*a* to make the adjustment partial image smaller on the projection surface 100.

On the other hand, in a case where the number of pixels that form the adjustment partial image in the captured image is smaller than the number of pixels that form the reference partial image in the captured image, the adjustment control section 224 moves the zoom lens 153*a* to make the adjustment partial image larger on the projection surface 100.

Further, the adjustment control section 224 adjust the position of the projection system 153 by using the lens shifter 170 to cause the position of the adjustment partial image to be on the right of the reference partial image.

For example, in a case where the size of the adjustment partial image is equal to the size of the reference partial image, the adjustment control section 224 moves the projection system 153 in such away that the coordinates (pixel coordinates) of the upper left corner of the adjustment partial image is on the right of the coordinates (pixel coordinates) of the upper right corner of the reference partial image and the coordinates of the lower left corner of the adjustment partial image is on the right of the coordinates (pixel coordinates) of the lower right corner of the reference partial image.

In the case where the adjustment control section 224 has adjusted the size and position of the adjustment partial image, the adjustment control section 224 causes the imaging section 180 to capture an image of the projection surface 100 again and uses captured image information produced by the re-image-capturing to adjust the adjustment partial image described above. The adjustment control section 224 repeats the adjustment described above until the position of the zoom lens 153*a* and the position of the projection system 153 each converge.

When the position of the zoom lens 153*a* and the position of the projection system 153 each converge, the adjustment control section 224 uses the communication section 190 to transmit completion notice indicating that the projection area 3B of the partial image 2B has been adjusted in accordance with the adjustment instruction to the main projector 10A (step S34).

Steps S31 to S34 shown in FIG. 9 are carried out also in the projector 10D, which is the other adjustment projector.

In the projector 10A, which is the main projector, the adjustment instruction section 223 evaluates whether or not the projector 10A has received the completion notice from all projectors to which the adjustment instructions had been transmitted (step S27). In the case where the projector 10A has received the completion notice from all the projectors to which the adjustment instructions had been transmitted (YES in step S27), the adjustment instruction section 223 evaluates whether or not the projector 10A has transmitted the adjustment instructions to all the subordinate projectors (step S28). In a case where the projector 10A has not transmitted the adjustment instructions to all the subordinate projectors (NO in step S28), the adjustment instruction section 223 returns to the process in step S22.

When the adjustment instruction section 223 returns to the process in step S22, the adjustment instruction section 223 sets the partial image determined to be the adjustment partial image last time as the reference partial image (step S22). For example, in a case where the partial images 2B and 2D were determined as the adjustment partial image last time, the adjustment instruction section 223 sets the partial images 2B and 2D to be the reference partial image.

The adjustment instruction section 223 then carries out steps S23 and S24.

For example, in the case where the partial images 2B and 2D are determined to be the reference partial image, the adjustment instruction section 223 determines the partial images 2C, 2E, and 2G to be the adjustment partial images in step S23 and determines the projectors 10C, 10E, and 10G to be the adjustment projectors in step S24.

The adjustment instruction section 223 subsequently produces adjustment instructions in step S25.

In the case where the reference partial image is the partial image 2A (red) and the adjustment partial image is formed of the partial images 2B (blue) and 2D (green), as described above, there is no adjustment partial image having the same color of the reference partial image. Therefore, even in a case where the reference information contained in the adjustment instructions shows only the color of the reference partial image, the reference partial image is uniquely identified by the reference information.

However, in a case where the main projector 10A projects the partial image 2A (red), the reference partial image is formed of the partial images 2B (blue) and 2D (green), and the adjustment partial image is formed of the partial images 2C (green), 2E (red), and 2G (blue), there is an adjustment partial image having the same color of the reference partial image.

Therefore, in the case where the reference information shows only the color of the reference partial image, it is difficult to uniquely identify the reference partial image only by the reference information.

In this case, the adjustment instruction section 223 produces, as the reference information contained in the adjustment instructions, information representing the color of the reference partial image, the color of an adjusted partial image in contact with the reference partial image, and the positional relationship between the adjusted partial image and the reference partial image.

For example, the adjustment instruction section 223 produces, as the reference information contained in the adjustment instructions, information representing the color of the reference partial image 2B (blue), the color of the adjusted partial image 2A (red) in contact with the reference partial image 2B, and the positional relationship representing that the reference partial image 2B is on the right of the adjusted partial image 2A.

The thus produced reference information allows identification of the reference partial image that is not the partial image 2G (blue) but is the partial image 2B (blue).

The adjustment instruction section 223 subsequently carries out step S26 to transmit the adjustment instructions to the adjustment projectors via the communication section 190.

The adjustment projectors, when they receive the adjustment instructions, each carryout steps S31 to S34 shown in FIG. 9. as described above.

For example, in a case where the adjustment projectors are the projectors 10C, 10E, and 10G, the captured image shows a situation in which there are a plurality of partial images having a color specified by the specifying information. Specifically, the partial images 2A (red), 2B (blue), 2C (green), 2D (green), 2E (red), and 2G (blue) are projected on the projection surface 100. Therefore, as for the projector 10C, which is one of the adjustment projectors, the captured image shows a situation in which there are two partial images drawn in green specified by the specifying information (partial images 2C and 2D).

In this situation, the adjustment partial image associated with the projector 10C is identified in step S33 as follows.

In a case where the captured image contains a plurality of partial images having a color specified by the specifying information (hereinafter referred to as "plurality of adjustment partial image candidates"), the adjustment control section 224 identifies an adjustment partial image candidate closest to the reference partial image as the adjustment partial image out of the plurality of adjustment partial image candidates. One adjustment partial image can therefore be identified in step S33.

Referring back to FIG. 8, in the case where the projector 10A has not received the completion notice from all the projectors to which the adjustment instructions had been transmitted (NO in step S27), the adjustment instruction section 223 evaluates whether or not a predetermined period has elapsed since the transmission of the last adjustment instruction (step S29). In a case where the predetermined period has not elapsed since the transmission of the last adjustment instruction (NO in step S29), the adjustment instruction section 223 returns to the process in step S27.

In a case where the predetermined period has elapsed since the transmission of the last adjustment instruction (YES in step S29), failure in the communication between the main projector and the subordinate projectors has possibly occurred. Therefore, the adjustment instruction section 223 outputs image information representing an error display image to the image processing section 120 to cause the projection section 150 to project the error display image on the projection surface 100 (step S30). The adjustment instruction section 223 subsequently transmits an adjustment termination instruction to all the subordinate projectors. The adjustment control section 224 of each of the subordinate projectors, when it receives the adjustment termination instruction, terminates the projection according to the adjustment instruction (projection of partial image having color specified by specifying information).

In the case where the adjustment instructions have been transmitted to all the subordinate projectors in step S28, the adjustment instruction section 223 transmits the adjustment termination instruction to all the subordinate projectors and then terminates the actions shown in FIG. 8.

The projector 10A, the multi-projection system 1, and the method for controlling the projector 10A according to the present embodiment allow adjustment of the projection areas of the partial images projected by the plurality of subordinate projectors based directly or indirectly on the projection area of the partial image projected by the projector 10A.

Therefore, for example, the user's adjustment of the projection area of the partial image projected by the projector 10A allows automatic adjustment of the other projection areas based on the adjusted projection area. The effort of the adjustment of the projection areas can therefore be reduced as compared with a case where the user adjusts all the projection areas.

Variations

The invention is not limited to the embodiment described above, and a variety of variations, for example, those that will be described below, are conceivable. Further, one or more variations arbitrarily selected from the following aspects of variations can be combined with one another as appropriate.

Variation 1

The target projection areas 3A to 3I set through the setting image 222a (see FIG. 6) may be so configured that those adjacent to each other may be in contact with each other as described above or may partially overlap with each other.

When adjacent projection areas overlap with each other, that is, when partial images having different colors overlap with each other, the color in the overlapping portion differs from the colors of the partial images. The adjustment control section 224 identifies the area having the color different from the colors of the partial images as a portion where the partial images overlap with each other and adjusts an adjustment partial image based on the result of the identification.

An example of the aspect in which adjacent projection areas partially overlap with each other is what is called edge blending. The edge blending is a technology for causing adjacent projection areas to partially overlap with each other and reducing the brightness of the overlapping portion so that the joint between the partial images is unlikely to be recognized.

As a method for setting the amount of overlapping, for example, the user may first manually adjust a projection area (projection area where subordinate projector projects partial image) adjacent to the projection area where the main projector projects a partial image to set the amount of overlapping, and another subordinate projector may adjust the projection area with reference to the set amount of overlapping.

Variation 2

The number of projectors that forms the multi-projection system 1 is not limited to nine and only needs to be at least three. The arrangement of a plurality of projection areas is not limited to be formed of the three vertical columns and three horizontal rows and can be changed as appropriate.

Variation 3

Out of the plurality of projectors that form the multi-projection system 1, the projector that serves as the main projector is not limited to the projector corresponding to the projection area at an end of a target projection area arrangement.

For example, in the case where the target projection area arrangement shown in FIG. 6 is employed, the projector 10E corresponding to the projection area 3E may be the main projector. In this case, there are a plurality of partial images having a color specified by the specifying information. It is therefore desirable to identify, as the adjustment partial image out of the plurality of partial images having a color specified by the specifying information, a partial image having a positional relationship with the reference partial image that is closest to the relative positional relationship indicated by the relativity information.

Variation 4

Figure 7:
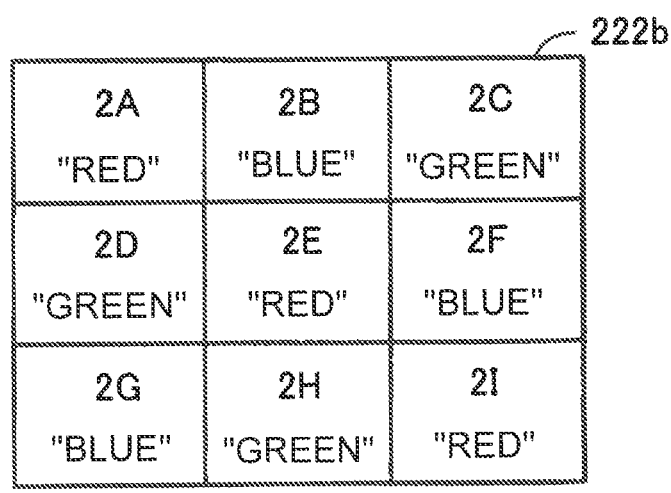
FIG. 7 shows an example of color information.

The colors of the partial images indicated by the color information are not limited to the colors of the partial images shown in FIG. 7, and the colors of partial images adjacent to each other on the projection surface 100 only need to differ from each other. Therefore, for example, the color of a partial image projected by the main projector is not necessarily red and may, for example, be blue or green.

Variation 5

Between the reference partial image and an adjustment partial image may be present another partial image.

Variation 6

The color specified by the specifying information is used to distinguish the partial image from others. The color specified by the specifying information is therefore preferably one selected from red, blue, and green, which greatly differ from one another in terms of the color component thereof. The color specified by the specifying information may be a color other than red, blue, and green.

Variation 7

In a case where the mount of shift of the projection system 153 required to move the projection range to a target projection range does not fall within the shiftable range over which the lens shifter 170 can shift the projection system 153, the adjustment control section 224 may cause the projection section 150 to project information that prompts the user to move the projector (for example, image information representing letters that stand for "Move projector." In this case, the adjustment control section 224 may also cause the projection section 150 to project information representing the direction in which the projector is moved. In this case, the adjustment control section 224 identifies the direction in which the projector is moved based on the captured image.

Variation 8

The entirety or part of the elements achieved when the control section 220 executes the program may be achieved by hardware formed, for example, of a field programmable gate array (FPGA), an application specific IC (ASIC), or any other electronic circuit or may be achieved by software and hardware that cooperate with each other.

Variation 9

In the projection section 150, liquid crystal light valves are used as the light modulator, but the light modulator is not limited to liquid crystal light valves and can be changed as appropriate. For example, the light modulator may instead be configured to use three reflective liquid crystal panels. The light modulator may still instead, for example, be configured to use one liquid crystal panel combined with a color wheel, three digital mirror devices (DMDs), or one digital mirror device combined with a color wheel. In the case where only one liquid crystal panel or DMD is used as the light modulator, no members corresponding to the color separation system and the light combining system are required. Further, a configuration including no liquid crystal panel or DMD but capable of modulating the light emitted by the light source can be employed as the light modulator.

What is claimed is:

1. A projector that is allowed to belong to a multi-projection system that projects an image on a projection surface, the image formed of a plurality of partial images including a first partial image, a second partial image, and a third partial image, the projector comprising:

one or more lenses that project the third partial image on the projection surface; and one or more processors that transmit, to a first projector that projects the first partial image, a first adjustment instruction of adjusting a projection area of the first partial image based on a projection area of the third partial image and transmit, to a second projector that projects the second partial image after transmitting the first adjustment instruction, a second adjustment instruction of adjusting a projection area of the second partial image based on the projection area of the first partial image, wherein a target projection area of the first partial image is in contact with or partly overlaps with the projection area of the third partial image.

2. The projector according to claim 1, wherein the first adjustment instruction contains a first size adjustment instruction of adjusting a size of the projection area of the first partial image based on a size of the projection area of the third partial image.

3. The projector according to claim 1, wherein the second adjustment instruction contains a second position adjustment instruction of adjusting a position of the projection area of the second partial image based on a position of the projection area of the first partial image.

4. The projector according to claim 1, wherein the second adjustment instruction contains a second size adjustment instruction of adjusting a size of the projection area of the second partial image based on a size of the projection area of the first partial image.

5. The projector according to claim 1, wherein a target projection area of the second partial image is in contact with or partly overlaps with the projection area of the first partial image.

6. The projector according to claim 1, wherein the plurality of partial images include the third partial image, a plurality of fourth partial images, and a plurality of fifth partial images, the first partial image is any of the plurality of fourth partial images, the second partial image is any of the plurality of fifth partial images, and the one or more processors transmit, for each of the fourth partial images to a third projector that is a projector that projects the fourth partial image, a third adjustment instruction of adjusting a projection area of the fourth partial image projected by the third projector based on the projection area of the third partial image, and after transmission of the third adjustment instruction, transmit, for each of the fifth partial images to a fourth projector that is a projector that projects the fifth partial image, a fourth adjustment instruction of adjusting a projection area of the fifth partial image projected by the fourth projector based on any of the fourth partial images.

7. A projector that is allowed to belong to a multi-projection system that projects an image on a projection surface, the image formed of a plurality of partial images including a first partial image, a second partial image, and a third partial image, the projector comprising:

one or more lenses that project the third partial image on the projection surface; and one or more processors that transmit, to a first projector that projects the first partial image, a first adjustment instruction of adjusting a projection area of the first partial image based on a projection area of the third partial image and transmit, to a second projector that projects the second partial image after transmitting the first adjustment instruction, a second adjustment instruction of adjusting a projection area of the second partial image based on the projection area of the first partial image, wherein the one or more processors transmit the second adjustment instruction to the second projector when the one or more processors receive from the first projector a completion notice indicating that the adjustment of the projection area of the first partial image has been completed in accordance with the first adjustment instruction.

8. A projector that is allowed to belong to a multi-projection system that projects an image on a projection surface, the image formed of a plurality of partial images including a first partial image, a second partial image, and a third partial image, the projector comprising:
   one or more lenses that project the third partial image on the projection surface; and
   one or more processors that transmit, to a first projector that projects the first partial image, a first adjustment instruction of adjusting a projection area of the first partial image based on a projection area of the third partial image and transmit, to a second projector that projects the second partial image after transmitting the first adjustment instruction, a second adjustment instruction of adjusting a projection area of the second partial image based on the projection area of the first partial image, wherein
   the first adjustment instruction contains a first position adjustment instruction of adjusting a position of the projection area of the first partial image based on a position of the projection area of the third partial image.

9. The projector according to claim 8, wherein the first adjustment instruction further contains first specific information for identifying the third partial image and first relative position information representing a relative positional relationship between the projection area of the third partial image and a target projection area of the first partial image.

10. The projector according to claim 9, wherein the first specific information represents a color of the third partial image.

11. The projector according to claim 10, wherein the first adjustment instruction further contains first specifying information that specifies a color different from the color of the third partial image as the color of the first partial image.

12. A multi-projection system that projects an image on a projection surface, the image formed of a plurality of partial images including a first partial image, a second partial image, and a third partial image, the multi-projection system comprising:
   a first projector that projects the first partial image on the projection surface;
   a second projector that projects the second partial image on the projection surface; and
   a third projector that projects the third partial image on the projection surface,
   the third projector transmits to the first projector a first adjustment instruction of adjusting a projection area of the first partial image based on a projection area of the third partial image,
   the first projector adjusts the projection area of the first partial image in accordance with the first adjustment instruction,
   the third projector, after transmitting the first adjustment instruction, transmits to the second projector a second adjustment instruction of adjusting a projection area of the second partial image based on the projection area of the first partial image, and
   the second projector adjusts the projection area of the second partial image in accordance with the second adjustment instruction.

13. A method for controlling a projector that is allowed to belong to a multi-projection system that projects an image on a projection surface, the image formed of a plurality of partial images including a first partial image, a second partial image, and a third partial image, the method comprising:
   projecting the third partial image on the projection surface;
   transmitting, to a first projector that projects the first partial image, a first adjustment instruction of adjusting a projection area of the first partial image based on a projection area of the third partial image; and
   transmitting, to a second projector that projects the second partial image after transmitting the first adjustment instruction, a second adjustment instruction of adjusting a projection area of the second partial image based on the projection area of the first partial image, wherein
   a target projection area of the first partial image is in contact with or partly overlaps with the projection area of the third partial image.

* * * * *